Figure 1:
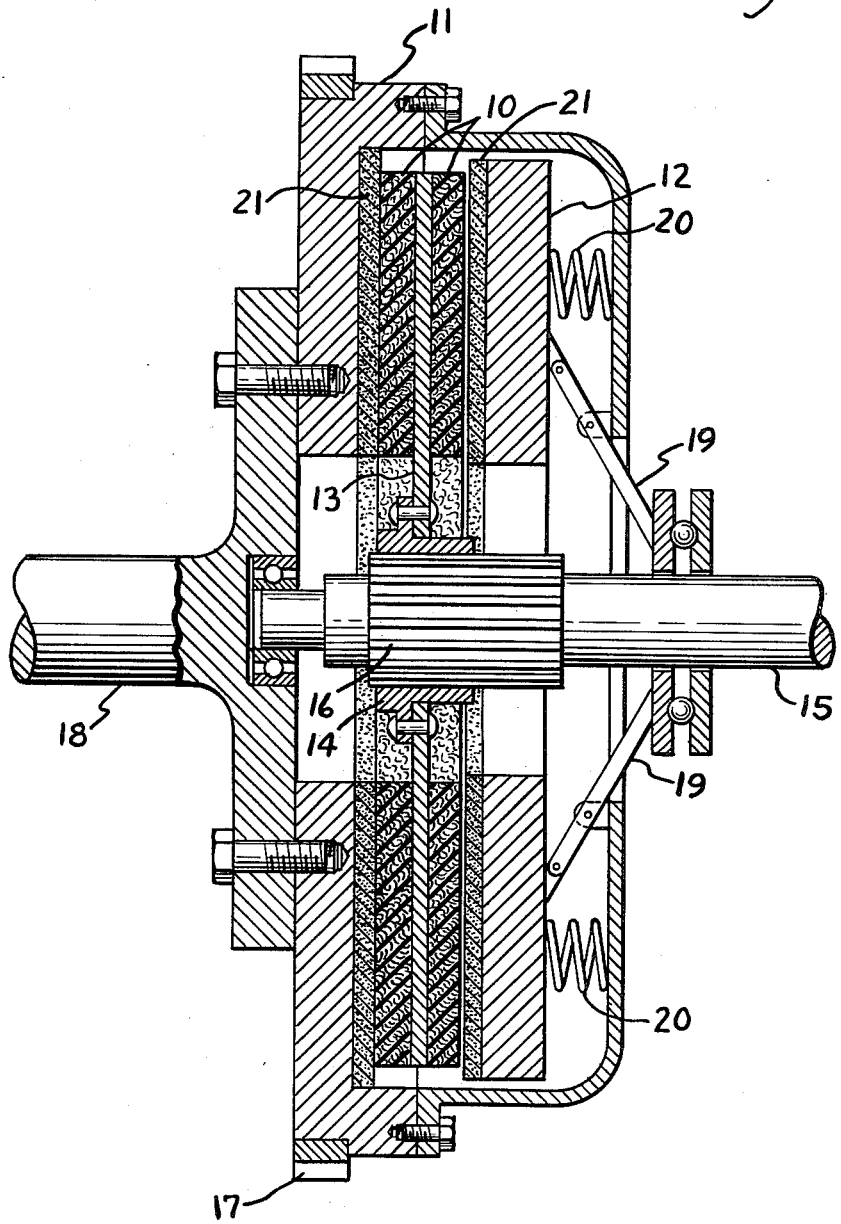

June 29, 1965

C. S. BATCHELOR ETAL 3,191,734

FRICTION MECHANISM WITH FIBER COMPOSITION
LINING AND MATING METAL LAYER

Filed Oct. 26, 1962

2 Sheets-Sheet 1

INVENTORS
CLYDE S. BATCHELOR
WARREN R. JENSEN by: Gary, Parker, Juettner & Cullinan
ATTYS.

June 29, 1965 C. S. BATCHELOR ETAL 3,191,734
FRICTION MECHANISM WITH FIBER COMPOSITION
LINING AND MATING METAL LAYER
Filed Oct. 26, 1962 2 Sheets-Sheet 2
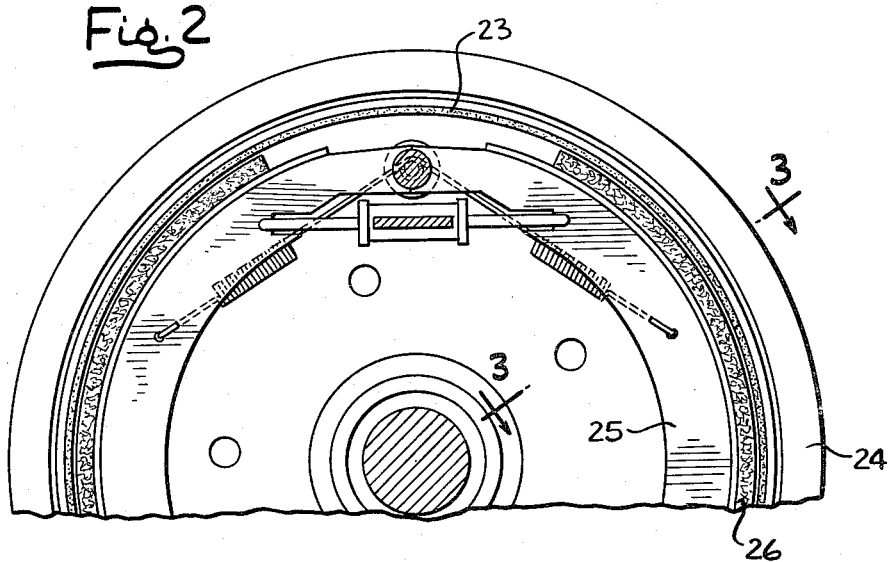
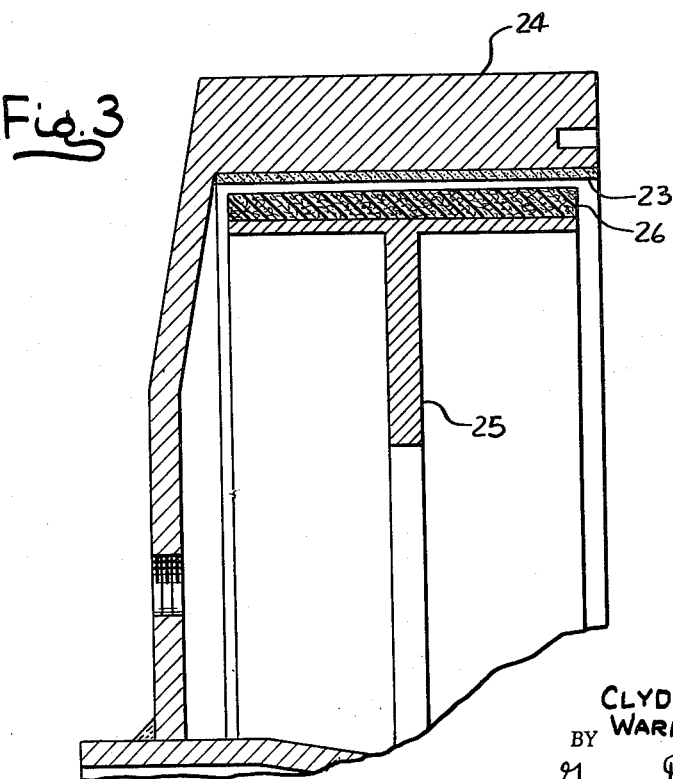
INVENTORS
CLYDE S. BATCHELOR
BY WARREN R. JENSEN
Gary, Desmond & Parker
ATTYS.

United States Patent Office 3,191,734
Patented June 29, 1965

3,191,734
FRICTION MECHANISM WITH FIBER COMPOSITION LINING AND MATING METAL LAYER
Clyde S. Batchelor, Trumbull, and Warren R. Jensen, Stratford, Conn., assignors to Raybestos-Manhattan, Inc., Passaic, N.J., a corporation of New Jersey
Filed Oct. 26, 1962, Ser. No. 233,210
5 Claims. (Cl. 192—68)

This invention relates to automotive and industrial friction devices designed for connecting and disconnecting at will two mechanical parts adapted for transmitting torque or power from one part to the other when the parts are connected, generally designated as clutches and automatic transmissions, and to friction devices designed for retarding or arresting the motion of a vehicle or mechanism with which the device is associated, generally designated as brakes.

The present invention is particularly concerned with the friction couples for the aforesaid devices comprising a metal mating component of high heat-conductive character, and a fiber-reinforced hardened organic binder containing friction material composition lining member, and specifically the former component and its cooperative relationship to the latter.

Thus, for example, a friction mechanism of the foregoing class in general comprises a support and at least a pair of elements mounted for relative rotational movement thereon and for bodily movement of one toward the other, and where the composition lining as aforesaid is mounted on one of said elements and a metallic mating member of high heat-conductive character is mounted on the other.

It has long been recognized that copper and certain alloys thereof, due to their high heat-conductive character, would be desirable as a metal mating element in friction couples of the class heretofore described. However, due to its softness and low yield point at the surface temperatures produced by even moderate usage, they have for such reason been found commercially uneconomical and not feasible except in instances where the high heat-conductive metal was provided with liquid cooling means, for example, such as described and claimed in Sanford Patent 2,821,271, and others.

Copper and its alloys as aforesaid, for example, even harder alloys of copper such as 1% chromium-copper and cadmium-copper, even when used against soft or highly graphitized friction linings becomes scored and at least the upper layers near the friction surface become plastic usually becoming erose with displacement of metal and frequently transfer to the friction lining material.

It is an object of the present invention to employ copper and high heat-conductive alloys thereof such as, for example, those having a melting point of at least 1500° F. and a thermal conductivity of at least 40% of that of pure electrolytic copper without necessity for employment of cooling liquid and which yet withal will remain stable and wear well for the purposes hereinbefore and hereinafter described.

It has been found that we can increase the "apparent or effective hardness" and resistance to plastic flow of copper and its alloys as aforesaid by uniform distribution with or incorporation in the matrix of copper as aforesaid, from about ½ to about 15% by volume of copper oxides and by applying or forming said mixture on the operative surface of the mating member of a friction couple composed of such base metallic materials as cast iron, aluminum, steel, etc. or metals commonly used as heat sinks in the conventional drum and disc brakes and clutches.

The term "apparent hardness" as used herein may be explained as follows: If substantially pure copper is checked by conventional means it will have a Mohs' scale hardness of approximately 2.5–3.0 and a Rockwell hardness of approximately F–50 to approximately B–40. If this copper is then run against conventional friction lining material it will score and wear badly. However, if this same copper has, for instance, dispersed uniformly throughout it in quantities of from about ½ to about 15% by volume copper oxides, which can be CuO, $Cu_2O$, $Cu_4O$, or their mixtures, and in fine particle size, the Mohs' scale and Rockwell hardness will be substantially as above at room temperature but at elevated temperatures, the hardness and the hot yield in compression will be effectively greater than pure copper, with yield points in compression showing little drop off at temperatures nearing the M.P. of copper (1980° F.) and in running against conventional friction linings no scoring or excessive plasticizing will take place. It is believed that this is because the lining is being supported by the relatively harder copper oxide particles while the copper merely acts as a thermal sponge to absorb and remove the heat from the friction track.

Very broadly, the present invention therefore is directed to a metal friction mating member having attached to its operative surface a highly heat-conductive layer composed of a matrix of copper, or its alloys as aforesaid, having dispersed therein particles of copper oxide in an amount to prevent scoring and plasticizing of the metal friction track and to prevent undue wear of the cooperative composition friction lining which is generally composed of a fiber reinforced hardened organic binder material.

Other objects and advantages of the present invention relating to its details of construction, arrangement of parts, and economies thereof, will be apparent from a consideration of the following specification and accompanying drawings wherein:

FIG. 1 diagrammatically illustrates in section a clutch embodying the present invention.

FIG. 2 diagrammatically illustrates a fragmentary section of an internally expanding cylindrical brake embodying the present invention.

FIG. 3 is a section on line 3—3 of FIG. 2.

In conventional mechanical clutches commonly used on trucks, buses, hoists, earthmoving equipment, etc. there are many variants but the simplest form is diagrammatically illustrated in FIG. 1 which comprises a pair of friction faces 10, 10 acting as a driven member, and a flywheel 11 and a pressure plate 12 acting as driving members. The friction faces 10, 10, which are composed of conventional fiber reinforced hardened organic binder friction composition lining material, are in the form of annular discs and are bonded to the annuular metal supporting disc 13 carried by the hub member 14, and adapted for axial movement on the drive shaft 15 on its splined portion 16. The flywheel 11 is associated with the starter gear 17 and the conventional crank shaft 18. The clutch is engaged by release of pressure on the clutch pedal through the releasing links 19 which allows springs 20, which have been contracted, to move axially and bring pressure through the floating disc facings 10, 10 on both the flywheel and pressure plate, which pressure, after the desirable momentary slip, causes the friction linings 10, 10 to rotate with the flywheel and transmit power to the drive shaft.

Clutches in general are designed to operate as friction couples in accelerating a fixed load up to a specified speed. The heat generated during the single engagement is not usually deleterious to the friction lining of the mating member. However, in many cases the cycling of the device is so rapid as to cause the overall temperature of the device to rise with correspondingly higher peak temperatures at the friction face during engagement. As the drum or disc metal temperature rises the peaks reached during an engagement can reach excessive levels causing lining wear as well as scoring and heat checking in the metal mating members.

In accordance with the present invention, the symptoms of excessive heat are eliminated or minimized by inlaying a mixture of copper and copper oxide particles on the operative surface of the metal mating member.

Thus, as shown in FIG. 1, the operative surface of the flywheel 11 is formed by a wear layer 21 composed of a mixture of copper or copper alloy and copper oxide particles. This composite is applied as by well known processes of spraying or plating directly onto the surface of the metal 11. In the illustration of FIG. 1, both the flywheel 11 and the pressure plate 12 are similarly provided with a wear surface 21 composed of a copper-copper oxide composite. However, it is not always necessary to treat both the flywheel and pressure plate in this manner or in the same manner, since frequently there is little wear on one of the friction linings, usually the side towards the flywheel which sometimes per se creates a massive heat sink.

The metal or metal matrix in direct metallurgical contact with the metallic friction carrier is preferably copper and will be so referred to hereinafter, but may be any copper alloy as hereinbefore described, or restated, one having a coefficient of heat transfer greater than 1500 B.t.u. per square foot, per hour, per degree F., per inch.

The mixture of copper or copper alloy and copper oxide can be formed in one or more manners. For example, the mixture can be formed in situ by spraying copper wire through a conventional metallizing spray gun in a substantially neutral atmosphere and wherein the heated molten copper is atomized by means of air under pressure. Conventionally the spray gun is positioned from about four to about ten inches from the work and during its passage the atomized copper particles become oxidized to a degree which is in the control of the operator, that is to say, control of the proportion of copper oxide formed can be regulated by the air or oxygen supply. Thus, the copper oxide content can be controlled or varied by, for example, controlling the distance of the spray to the work and thus by oxygen content in the air through which the spray passes, or by controlling the oxygen content of the oxy-acetylene or oxy-propane gas employed in melting the copper wire or particle feed to the spray or metallizing gun.

This can thus result in the forming of from about ½ to 15% by volume of copper oxide, the copper oxide particles being in the form of lamellar islands homogeneously dispersed throughout the remaining body or matrix of deposited copper. This brings about what may be described as "precipitation hardening." It results in the copper per se becoming slightly hardened so that it has a hardness of about 3½ Mohs as deposited. In addition, working of the surface of the copper-copper oxide deposit tends to increase this precipitation hardness. In other words this phenomenon of precipitation hardness persists and increases in use. This precipitation hardness is enhanced by alternate heating and cooling of the piece in use and by hot and cool working of the metal interface in frictional engagement at temperatures of in the range of from about 800 to about 1200° F.

The advantages of precipitation hardening are the prevention of plastic flow which is otherwise inherent in soft copper and prevention of scoring of the mating surfaces in frictional engagement. Another advantage is that addition of copper oxide raises the energy level at which the composite can be employed.

The copper oxides are normally of from about four to about five in Mohs' scale hardness whereas copper per se, that is pure copper, is from about 2½ to about 3 on the same scale.

Another method of forming the copper-copper oxide deposit or layer is to separately spray the particles of copper and particles of copper oxide through a heated atmosphere by means of a Schoop gun. In this method the particles of copper and particles of copper oxide are sprayed through a heated zone wherein the two are mixed and the copper particles are melted. In the first mentioned method where a spray gun is employed copper wire is fed and melted by means of an oxy-acetylene or oxy-propane gas and atomized with air under pressure.

Thus when copper oxide powder is employed it can be sprayed jointly or separately with the copper and the copper melted so that on deposit the copper with lamellar islands of copper oxide form a uniform or homogeneous coating, which is later machined if necessary.

As another alternative, copper oxide powder can be sprayed jointly with the copper particles or solid copper wire while the copper is being melted and atomized, to form either the whole or part of the copper oxide component desired. That is to say, if desired all of the copper oxide inclusion can be in the form of preformed copper oxide powdered particles or in the alternative all the copper oxide inclusion can be formed in situ by spraying through an atmosphere of air or oxygen controlled to desired degree of conversion.

The use of copper-copper oxide mixtures is highly desirable since the copper is of high thermal conductivity and is therefore eminently suitable for the practice of the present invention, as distinguished from other metals which, although of higher melting point have a lower thermal conductivity. Furthermore, as distinguished from metals which have a higher melting point, and which as a result often bring about undue scoring of the mating friction material composition, the copper-copper oxide composition produces a lower rate or minimum amount of wear with resulting enhanced life of both the friction material composition and the copper-copper oxide wearing surface on the metal mating member.

In the practice of the present invention it has been found that a friction surface of a few thousandths inch or more of thickness of the copper-copper oxide mixture can be sprayed or plated by commercial procedures to produce a surface which resists abrasion and spectacularly reduces plastic flow. While heat conductance is reduced slightly by the copper oxide additive, this is only so in approximate algebraic relationship to its percent by volume.

It is believed that all of the physical properties at high temperature of the copper in the wear layer are greatly increased by the copper oxide additive which is thus believed to account for its resistance to plastic flow and apparent increase in hardness.

Tests run in the range of 75° F. to 1000° F. showed that copper was slightly harder at room temperature than a copper containing 3.5% by volume of dispersed copper oxide.

In the illustration of FIG. 1, the wear surface layer 21 can be composed of the sprayed composite of copper and about 4% by volume of copper oxide formed in situ by the spraying process in an oxidizing atmosphere.

As an alternative, the wear layers 21 can suitably be prepared by plating with copper and 4% by volume of copper oxide which produces deposits of very uniformly dispersed finely divided copper oxide within the copper matrix.

Thus, the wear layers 21 in FIG. 1 or the wear layer 23 of FIGS. 2 and 3 can be suitably directly applied to either the pressure plate 12, the flywheel 11, or to the brake drum 24. The copper-copper oxide composite can also be advantageously applied to the surfaces of disc brakes and automatic transmission metal plates, which plates are suitably composed of aluminum, the term aluminum being understood to embrace its conventional alloys.

A suitable example of the wear layer 21 or 23 is one composed of sprayed copper containing 3% by volume of copper oxide, to a thickness of .125 inch, this thickness being suitable for use as both a frictional wear zone and a heat sink.

FIGS. 2 and 3 show a conventional brake drum or friction coupled composed of the aluminum brake drum 24, in this case having a copper-copper oxide wear surface layer 23 and brake shoes 25 carrying friction composition lining 26 for cooperative engagement with the brake drum.

Aluminum brake drums of common mold or die casting formulations may be made operable in accordance with the present invention by spraying of copper and 10% by volume of copper oxide particles to a finished thickness of about .005–.030 inch.

Further examples of the present invention comprise spraying with .040" of copper and approximately 10% by volume of copper oxide and then surface machined to 120 micro finish or better. A cast iron plate was treated in the same manner. Similarly, an aluminum base was prepared for metal spraying and sprayed with copper under oxidizing conditions regulated to form about 5% by volume of copper oxide to a thickness of .140" and then finished machined to ⅛" in thickness.

The overall thickness of the heat conducting and wear resistant overlay may be very thin for low, or what might be termed normal operations, but in the relatively high energy range thicknesses of ¹⁄₁₆" to ⅛" can be employed.

Although we have shown and described preferred embodiments of our invention it will be understood by those skilled in the art that changes may be made in the details thereof without departing from its scope as comprehended by the following claims.

We claim:

1. In a friction mechanism, a friction couple comprising a pair of elements adapted for relative rotational movement on mounting means therefor, a fiber reinforced, hardened organic binder friction composition lining of relatively low heat conductivity secured to and supported on one element of said couple, another element of said couple comprising a metallic mating member carrying on a surface thereof a layer of metal of the group of copper and its high heat conductive alloys having dispersed therein finely divided copper oxide particles positioned for frictional engagement with the surface of said lining.

2. The friction mechanism of claim 1, wherein the copper oxide particles comprise from about 0.5% to about 15% by volume of said high heat conductive metal layer.

3. The friction mechanism of claim 1 wherein the metallic material in said facing is selected from the group consisting of copper and alloys thereof having a melting point of at least 1500° F. and a thermal conductivity at least 40% of that of pure electrolytic copper.

4. A metallic mating member for a friction couple, said member carrying on a surface thereof a layer of relatively high heat conductive metal matrix selected from the group consisting of copper and alloys thereof having a melting point of at least 1500° F. and a thermal conductivity at least 40% of that of pure electrolytic copper, having dispersed therein from about 0.5% to about 15% by volume of finely divided lamellar islands of copper oxide, said surface layer being adapted for frictional engagement with the surface of a fiber-reinforced, hardened organic binder friction composition lining.

5. The article of claim 4, wherein the metallic mating member is composed of aluminum.

References Cited by the Examiner

UNITED STATES PATENTS

| | | | |
|---|---|---|---|
| 2,404,598 | 7/46 | Sachse | 75—206 |
| 2,894,838 | 7/59 | Gregory | 29—182.5 |
| 3,007,553 | 11/61 | Sinclair et al. | |
| 3,014,884 | 12/61 | Bray | 29—182.5 |
| 3,026,200 | 3/62 | Gregory | 29—182.5 |
| 3,113,647 | 12/63 | Tuttle. | |

FOREIGN PATENTS

| | | |
|---|---|---|
| 611,950 | 1/61 | Canada. |
| 677,144 | 8/52 | Great Britain. |

DAVID J. WILLIAMOWSKY, *Primary Examiner.*